US009246368B2

(12) United States Patent
Nara et al.

(10) Patent No.: US 9,246,368 B2
(45) Date of Patent: Jan. 26, 2016

(54) CLAW POLE TYPE MOTOR

(71) Applicant: MINEBEA CO., LTD., Kitasaku-Gun, Nagano (JP)

(72) Inventors: Kiyohisa Nara, Fukuroi (JP); Takeshi Matsuno, Hamamatsu (JP); Masashi Ohba, Hamamatsu (JP)

(73) Assignee: Minebea Co., Ltd., Nagano (JP)

( * ) Notice: Subject to any disclaimer, the term of this patent is extended or adjusted under 35 U.S.C. 154(b) by 365 days.

(21) Appl. No.: 13/956,523

(22) Filed: Aug. 1, 2013

(65) Prior Publication Data

US 2014/0125160 A1 May 8, 2014

(30) Foreign Application Priority Data

Aug. 9, 2012 (JP) ................................. 2012-176860

(51) Int. Cl.
*H02K 5/24* (2006.01)
*H02K 1/14* (2006.01)
*H02K 3/52* (2006.01)

(52) U.S. Cl.
CPC *H02K 5/24* (2013.01); *H02K 1/145* (2013.01); *H02K 3/525* (2013.01)

(58) Field of Classification Search
CPC ................................. H02K 5/24; H02K 37/22
USPC ..................... 310/51, 49.01–49.55
See application file for complete search history.

(56) References Cited

U.S. PATENT DOCUMENTS

| 3,890,514 | A | * | 6/1975 | Mutz | ........................ | H02K 7/22 188/322.5 |
| 3,894,252 | A | * | 7/1975 | Miwa | ..................... | H02K 21/40 310/114 |
| 5,043,613 | A | * | 8/1991 | Kurata | .................. | H02K 7/116 310/49.13 |
| 2004/0061388 | A1 | * | 4/2004 | Matasushita | ........... | H02K 37/14 310/49.36 |
| 2008/0084127 | A1 | * | 4/2008 | Sekine | ................... | H02K 1/145 310/49.36 |
| 2008/0084131 | A1 | * | 4/2008 | Yamawaki | ............... | H02K 5/08 310/89 |

FOREIGN PATENT DOCUMENTS

JP 63-144736 A 6/1988
JP 2003-189584 A 7/2003

* cited by examiner

*Primary Examiner* — Thanh Lam
(74) *Attorney, Agent, or Firm* — Carrier Blackman & Associates, P.C.; Joseph P. Carrier; William D. Blackman

(57) ABSTRACT

A claw pole type motor is provided and includes: a rotor which includes a magnet and a rotation shaft around which the magnet is attached; and a stator which includes a bobbin, a winding wound around the bobbin, and a yoke which includes a plurality of pole teeth disposed to oppose the magnet and which is located outside the winding, wherein a vibration suppressing means is provided which makes contact with a distal end portion of the pole tooth and by which the pole tooth is pressure-supported on an inner circumferential surface of the bobbin, whereby the pole tooth is suppressed from vibrating.

5 Claims, 12 Drawing Sheets

Center line

<The location of supporting the pole tooth and noise levels> dB(A)

| | Conventional sample | Proximal end portion | Middle portion | Distal end portion |
|---|---|---|---|---|
| Sample 1 | 34.3 | 33.6 | 32.7 | 30.8 |
| Sample 2 | 35.5 | 33.8 | 31.5 | 30.8 |

CLAW POLE TYPE MOTOR

BACKGROUND OF THE INVENTION

1. Field of the Invention

The present invention relates to a claw pole type motor configured to reduce noise.

2. Description of the Related Art

Due to the recent trend of energy conservation, the automotive industry, for example, faces an urgent need to develop hybrid vehicles in which both a gasoline engine and an electric motor are used to thereby reduce fuel consumption, or electric vehicles in which a motor to drive wheels is electrically activated by means of a battery.

In the circumstances described above, hybrid vehicles and electric vehicles are increasingly further developed. In the hybrid vehicles and the electric vehicles, an electric motor is used as a driving source, and so in-vehicle noises are lowered thus largely enhancing quietness in the vehicle. As the result of the lowered in-vehicle noises, the noise level of an actuator, which is conventionally accepted for an in-vehicle HVAC (heating, ventilation, and air conditioning) system, is not good enough for the hybrid vehicles and the electric vehicles in which cabin quietness is improved, and therefore it is requested that noises be further reduced. That is to say, the noise produced by the conventional actuator is now too loud for the hybrid and electric vehicles, and further noise reduction is required.

In view of the above situation, for the purpose of reducing vibration noises of an actuator, it is required to further reduce noises of a motor which causes the vibration noises. With regard to noises from an actuator used for the in-vehicle HVAC system, in the case when a claw pole type motor is used for an actuator, a magnetic field generated in a winding causes a pole tooth to vibrate thus producing noises. Conventional countermeasures to reduce such vibration noises are disclosed in Japanese Patent Applications Laid-Open Nos. S63-144736 and 2003-189584.

While the countermeasure suggested in Japanese Patent Application Laid-Open No. S63-144736 is not mainly aimed to prevent or suppress vibration, it is described therein that the inner surface of bobbin (6a', 6b') is tapered so as to form a chevron mark, whereby, for example, when a inner yoke tooth (11a, 11b) is press-fitted, the inclination of the inner yoke tooth (11a, 11b) is corrected so that a inner yoke (5a, 5b) can be positioned accurately, which results in that the inner yoke (5a, 5b) and the bobbins (6a' 6b') are fixed to each other completely. Consequently, a problem of vibration generated by a motor in which a winding is not fixed to a yoke in an accurate manner can be remedied.

Referring now to FIG. 1 of Japanese Patent Application Laid-Open No. 2003-189584, a cup-shaped stator core (20, 22) includes a stator yoke portion (20a, 22a) and a magnetic pole (20b, 22b) which extends in the axial direction such that the width decreases toward the distal end, and a magnetic pole housing portion (39) which is formed to have a substantially same shape as the magnetic pole (20b, 22b) is provided at an inner circumferential surface of a cylinder portion (33) (see FIG. 3 thereof) of a winding bobbin (30).

When the magnetic pole (20b, 22b) of the stator core (20, 22) is inserted into the magnetic pole housing portion (39) of the cylinder portion (33) of the winding bobbin (30), a circumferential side surface of the magnetic pole (20b, 22b) is brought into contact with the magnetic pole housing portion (39) in a sliding manner, thereby automatically correcting positional misalignment. That is to say, the circumferential side surface of the magnetic pole (20b, 22b) makes contact with a circumferential side surface of the magnetic pole housing portion (39) of the cylinder portion (33) of the winding bobbin (30), which is effective in preventing or suppressing characteristic anomaly, vibration and noise which are attributable to positional misalignment.

However, the countermeasure described in Japanese Patent Application Laid-Open No. S63-144736, in which only the center portion of the yoke tooth (11a, 11b) is brought into contact with the bobbin (6a' 6b'), does not work sufficiently to absorb the vibration of the yoke tooth (11a, 11b) (refer to FIGS. 8A and 8B of the present invention).

On the other hand, in the countermeasure described in Japanese Patent Application Laid-Open No. 2003-189584, the circumferential side surface of the magnetic pole (20b, 22b) is only in contact with the circumferential side surface of the magnetic pole housing portion (39). In the above structure, if the distal end portion of the magnetic pole (pole tooth) is disposed freely with respect to a width direction of a steel plate of the magnetic pole (pole tooth), which is oriented orthogonal to (90 degrees different from) the circumferential direction of the contact and in which vibration tends to occur, the countermeasure fails to sufficiently prevent or suppress vibration or noise attributable to the resonance at an eigen frequency of the pole tooth.

SUMMARY OF THE INVENTION

The present invention has been made in view of the circumstances described above, and it is an object of the present invention to provide a claw pole type motor in which vibration noises can be reduced with a simple structure.

In order to achieve the object described above, according to one aspect of the present invention, there is provided a claw pole type motor configured to include: a rotor which includes a magnet and a rotation shaft around which the magnet is attached; and a stator which includes a bobbin, a winding wound around the bobbin, and a yoke which includes a plurality of pole teeth disposed to oppose the magnet and which is located outside the winding.

In the claw pole type motor described above, a vibration suppressing means is provided which makes contact with a distal end portion of the pole tooth and by which the pole tooth is pressure-supported on an inner circumferential surface of the bobbin.

According to the one aspect of the present invention, since the distal end portion of the pole tooth is pressure-supported on the inner circumferential surface of the bobbin, the pole tooth is suppressed from vibrating.

In the one aspect of the present invention, the vibration suppressing means may be formed integrally with the bobbin when the bobbin is produced.

According to the one aspect of the present invention, since the vibration suppressing means is formed integrally with the bobbin when the bobbin is produced, the cost increase can be suppressed.

Also, in the one aspect of the present invention, the vibration suppressing means may be formed at a ring-shaped member which is inserted at the inner circumferential surface of the bobbin.

According to the one aspect of the present invention, since the vibration suppressing means is formed at the ring-shaped member which is inserted at the inner circumferential surface of the bobbin, the assembly work becomes easier.

According to another aspect of the present invention, there is provided a claw pole type motor, in which either a protruding portion or a bent portion, which works as a vibration suppressing means and which makes contact with an inner circumferential surface of the bobbin, is provided at a distal end portion of the pole tooth, whereby the distal end portion of the pole tooth is pressure-supported on the inner circumferential surface of the bobbin.

According to the another aspect of the present invention, since the distal end portion of the pole tooth is pressure-supported on the inner circumferential surface of the bobbin, the pole tooth is suppressed from vibrating thus reducing noises.

According to the present invention, there is provided a claw pole type motor with a simple structure in which vibration noises can be reduced.

DETAILED DESCRIPTION OF THE INVENTION

Exemplary embodiments of the present invention will hereinafter be described with reference to the accompanying drawings.

Figure 1:
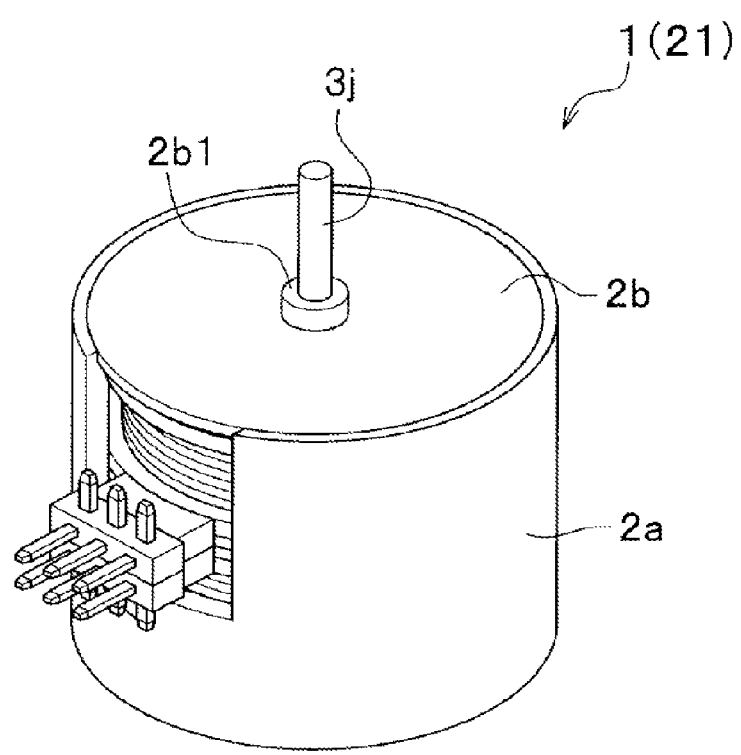
FIG. 1 is a perspective view of a motor according to an embodiment of the present invention.

FIG. 1 is a perspective view of a motor according to an embodiment of the present invention. Referring to FIG. 1, a claw pole (claw magnetic pole) type motor 1 according to an embodiment of the present invention is illustrated perspectively. The claw pole type motor 1 will hereinafter be referred to simply as "motor 1" as appropriate.

The motor 1 includes a lower housing 2a and an upper housing 2b which in combination form an outer case in which a rotor 3 (to be described herein later) and a stator 1K (both to be described) are housed. A rotation shaft 3j of the rotor 3, which works as an output shaft of turning force of the motor 1, is provided so as to protrude from the upper housing 2b.

Figure 2:
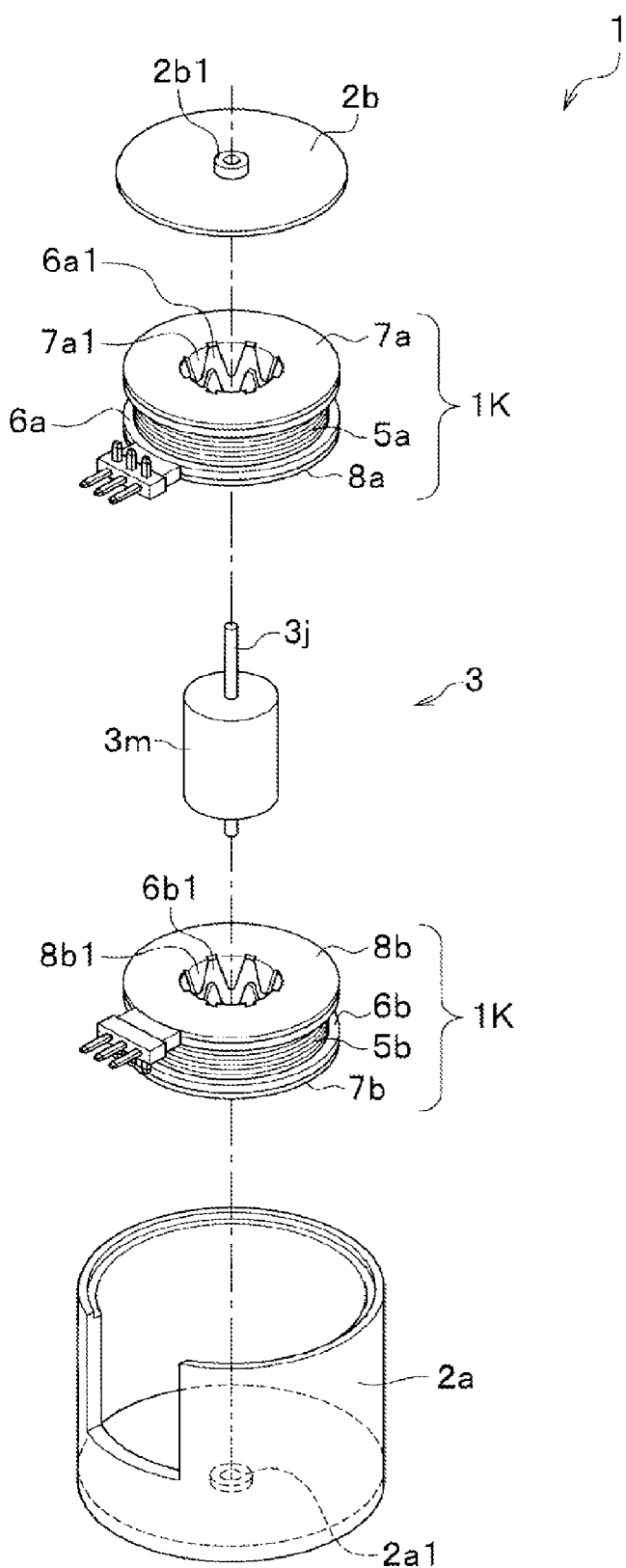
FIG. 2 is an exploded perspective view of the motor shown in FIG. 1.

The motor 1 is shown in FIG. 2 in an exploded perspective view. Referring to FIG. 2, the rotor 3 included in the motor 1 includes a permanent magnet 3m and the rotation shaft 3j around which the permanent magnet 3m is fixedly attached.

The lower housing 2a includes a bearing 2a1 which is attached to the lower housing 2a by fitting, press-fitting, or a like method. The rotation shaft 3j of the rotor 3 is inserted through the bearing 2a1 and rotatably supported.

The upper housing 2b includes a bearing 2b1 which is attached to the lower housing 2b by fitting, press-fitting, or a like method. The rotation shaft 3j of the rotor 3 is inserted through the bearing 2b1 and rotatably supported.

The stator 1K of the motor 1 includes a first bobbin 6a around which a first winding 5a is wound and a second bobbin 6b around which a second winding 5b is wound.

Figure 3A:
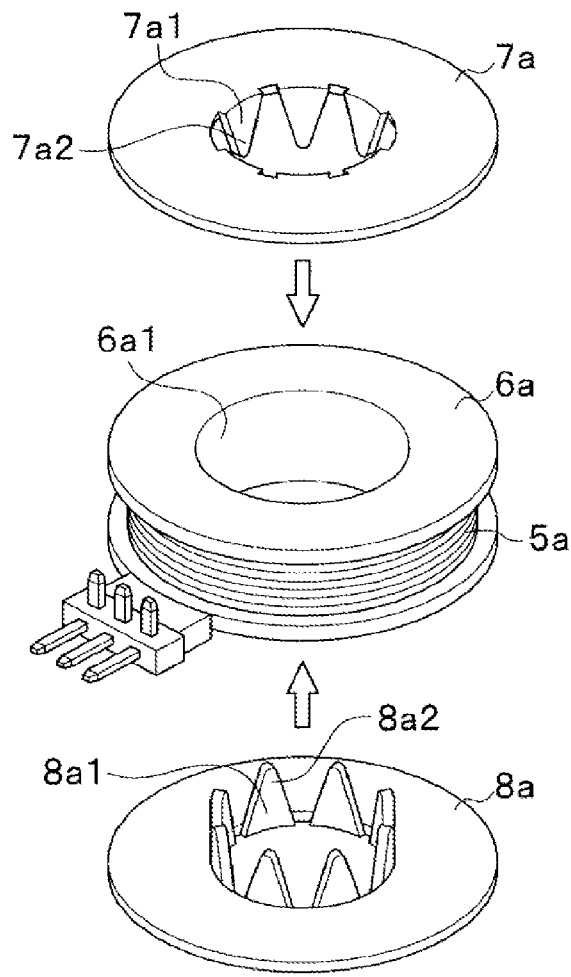
FIG. 3A is a perspective view of a process for assembling a first bobbin.
Figure 3B:
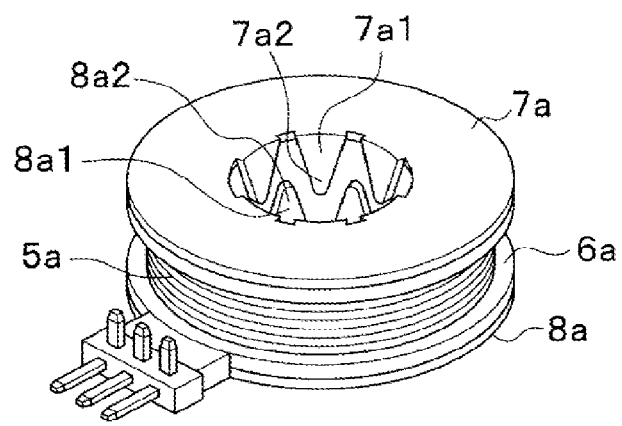
FIG. 3B is a perspective view of the first bobbin assembled.

FIG. 3A shows perspectively a process for assembling the first bobbin 6a, and FIG. 3B shows perspectively the assembled first bobbin 6a.

Referring to FIG. 3A, a first outer yoke 7a, on which a plurality of first pole teeth 7a1 are formed so as to oppose an inner circumferential surface 6a1 of the first bobbin 6a, is arranged at one axial side of the first bobbin 6a having the first winding 5a wound therearound.

Also, a first inner yoke 8a, on which a plurality of first pole teeth 8a1 are formed so as to oppose the inner circumferential surface 6a1 of the first bobbin 6a and so as to intermesh with the first pole teeth 7a1, is arranged at the other axial side of the first bobbin 6a.

Thus, the first outer yoke 7a and the first inner yoke 8a are, as indicated by arrows in FIG. 3A, set at respective axial sides of the first bobbin 6a having the first winding 5a wound therearound (refer to FIG. 3B).

As a result, both the axial sides of the first winding 5a wound around the first bobbin 6a are covered by the first outer yoke 7a and the first inner yoke 8a, and thus a magnetic circuit is formed.

Figure 4A:
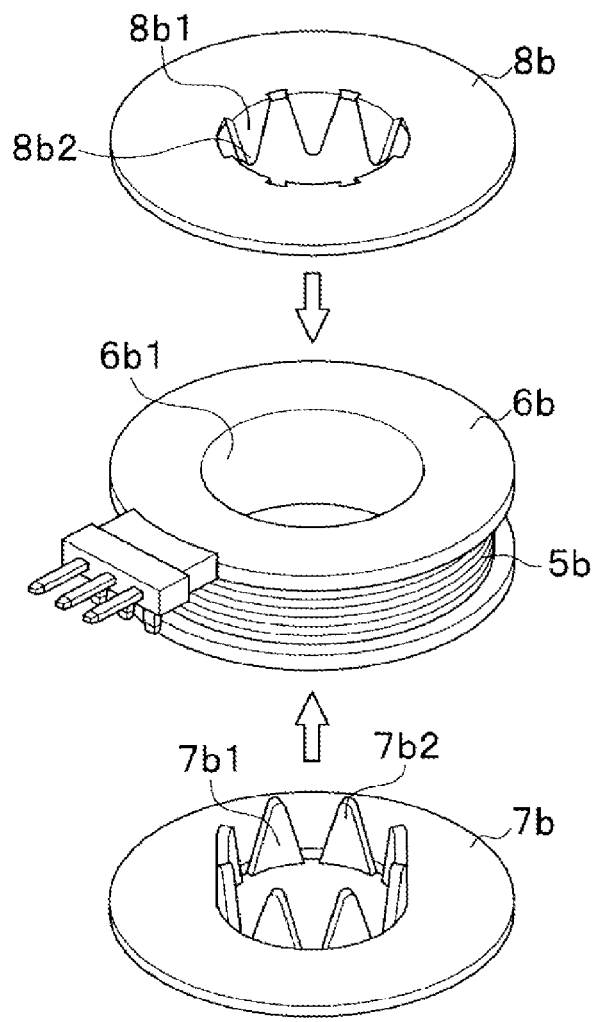
FIG. 4A is a perspective view of a process for assembling a second bobbin.
Figure 4B:
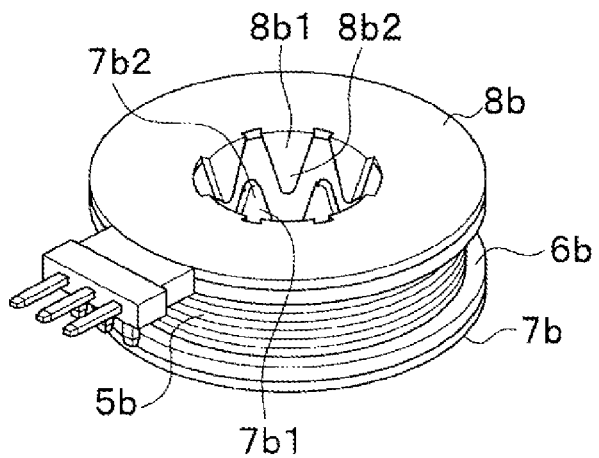
FIG. 4B is a perspective view of the second bobbin assembled.

FIG. 4A shows perspectively a process for assembling the second bobbin 6b, and FIG. 4B shows perspectively the assembled second bobbin 6b.

Referring to FIG. 4A, a second outer yoke, 7b, on which a plurality of first pole teeth 7b1 are formed so as to oppose an inner circumferential surface 6b1 of the second bobbin 6b, is arranged at one axial side of the second bobbin 6b having the second winding 5b wound therearound.

Also, a second inner yoke 8b, on which a plurality of second pole teeth 8a1 are formed so as to oppose the inner circumferential surface 6b1 of the second bobbin 6b and so as to intermesh with the second pole teeth 7b1, is arranged at the other axial side of the second bobbin 6b.

Thus, the second outer yoke 7b and the second inner yoke 8b are, as indicated by arrows in FIG. 4A, set at respective axial sides of the second bobbin 6a having the second winding 5b wound therearound (refer to FIG. 4B).

As a result, both the axial sides of the second winding 5b wound around the second bobbin 6b are covered by the second outer yoke 7b and the second inner yoke 8b, and thus a magnetic circuit is formed.

Figure 5:
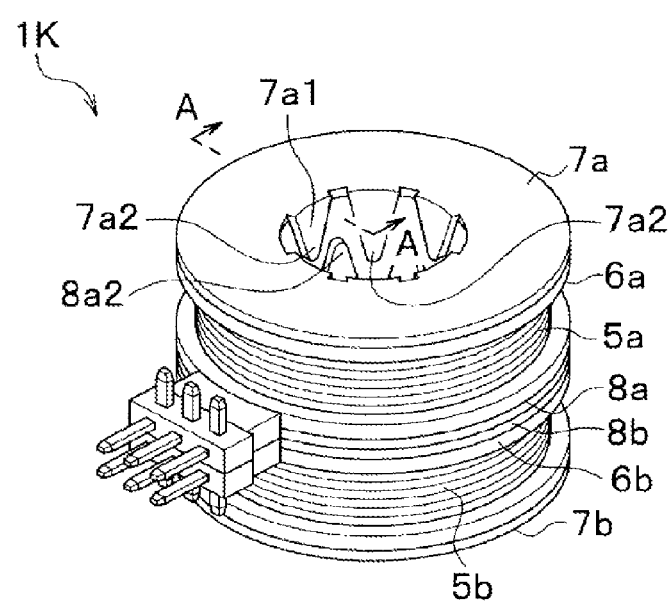
FIG. 5 is a perspective view of a stator of the motor shown in FIG. 1.

The assembled first bobbin 6a, around which the first winding 5a is wound, and the assembled second bobbin 6b, around which the second winding 5b is wound, are axially jointed to each other by adhesive or the like in a unified manner, whereby the stator 1K, which is perspectively shown in FIG. 5, is assembled.

The order of assembly process for the stator 1K is not limited to what is described above.

Figure 6:
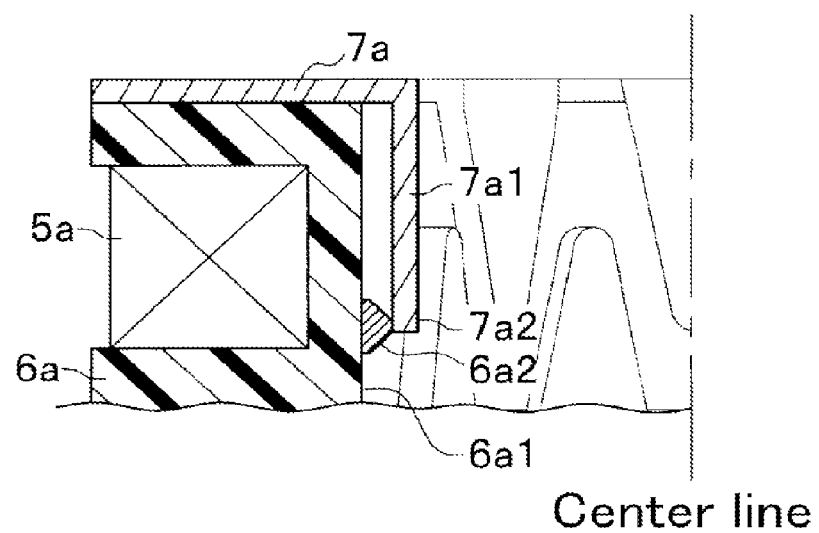
FIG. 6 is a schematic cross sectional view of a part of the stator, taken along a line A-A indicated in FIG. 5.

FIG. 6 schematically shows a cross section of a part of the stator 1K, taken along a line A-A indicated in FIG. 5.

Referring to FIG. 6, a contact portion 6a2, with which a distal end portion 7a2 of the first pole tooth 7a1 comes into contact, is formed at the inner circumferential surface 6a1 of the first bobbin 6a, whereby the distal end portion 7a2 of the first pole tooth 7a1, which otherwise is disposed free, is now pressure-supported on the inner circumferential surface 6a1 of the first bobbin 6a. The contact portion 6a2 may be formed either integrally with or separately from the inner circumferential surface 6a1 of the first bobbin 6a.

Another contact portion (not shown in the figures), which has a shape substantially identical with that of the contact portion 6a2 and with which a distal end portion 8a2 (refer to FIG. 3B) of the first pole tooth 8a1 comes into contact, is formed at the inner circumferential surface 6a1 of the first bobbin 6a, whereby the distal end portion 8a2 of the first pole tooth 8a1, which otherwise is disposed free, is now pressure-supported on the inner circumferential surface 6a1 of the first bobbin 6a. This contact portion may be formed either integrally with or separately from the inner circumferential surface 6a1 of the first bobbin 6a.

Further, a contact portion (not shown in the figures), which has a shape substantially identical with that of the contact portion 6a2 and with which a distal end portion 7b2 (refer to FIG. 4B) of the second pole tooth 7b1 comes into contact, is formed at the inner circumferential surface 6b1 of the second bobbin 6b, whereby the distal end portion 7b2 of the second pole tooth 7b1, which otherwise is disposed free, is now pressure-supported on the inner circumferential surface 6b1 of the second bobbin 6b. This contact portion may be formed either integrally with or separately from the inner circumferential surface 6b1 of the second bobbin 6b.

Another contact portion (not shown in the figures), which has a shape substantially identical with that of the contact portion 6a2 and with which a distal end portion 8b2 (refer to FIG. 4B) of the second pole tooth 8b1 comes into contact, is formed at the inner circumferential surface 6b1 of the second bobbin 6b. This contact portion may be formed either integrally with or separately from the inner circumferential surface 6b1 of the second bobbin 6b.

It was found out in a vibration analysis taken on conventional claw pole type motors that vibration which is generated when a claw pole type motor rotates and which causes noises is attributed to vibration of a yoke (pole tooth), and consequently the above described configuration having the contact portion comes from a suggestion that the distal end portion of the pole tooth of the yoke should be kept from floating loose in the air (in a free end state) in order to prevent or suppress the yoke from vibrating.

In order to follow the suggestion, two approaches are conceivable. Specifically, one approach is to modify the bobbin (6a, 6b) [first method], and the other is to modify the pole tooth (7a1, 7b1, 8a1, 8b1) of the yoke (7a, 7b, 81, 8b) [second method].

The first method is configured such that a bias applying means (vibration suppressing means), which is adapted to give a moderate force or tension to the distal end portion (7a2, 7b2, 8a2, 8b2) of the pole tooth (7a1, 7b1, 8a1, 8b1), is provided at the brim portion of the inner circumference surface (6a1, 6b1) of the bobbin (6a, 6b).

FIG. 6 shows an example of the first method, in which the contact portion 6a2 with which the distal end portion 7a2 of the first pole tooth 7a1 makes contact is formed at the first bobbin 6a. As shown in FIG. 6, the distal end portion 7a2 of the first pole tooth 7a1, which otherwise is kept free, is now pressure-supported on the inner circumferential surface 6a1 of the first bobbin 6a.

The contact portion 6a2 may be formed separately from the bobbin (6a, 6b) as described above, but is preferably formed integrally with the bobbin (6a, 6b) in view of holding down the increase of number of component members and achieving an easier assembly work.

Specifically, it is preferable that the contact portion 6a2 is formed by modifying the shape of the inner circumferential surface (6a1, 6b1) of the bobbin (6a, 6b) so that the contact portion 6a2 is integrated with the bobbin (6a, 6b). For example, if the contact portion 6a2 is formed integrally with the bobbin (6a, 6b) by injection molding, then the cost increase can be suppressed.

On the other hand, in the second method, a vibration suppressing means is provided at the pole tooth (7a1, 7b1, 8a1, 8b1), rather than at the bobbin (6a, 6b).

Figure 7A:
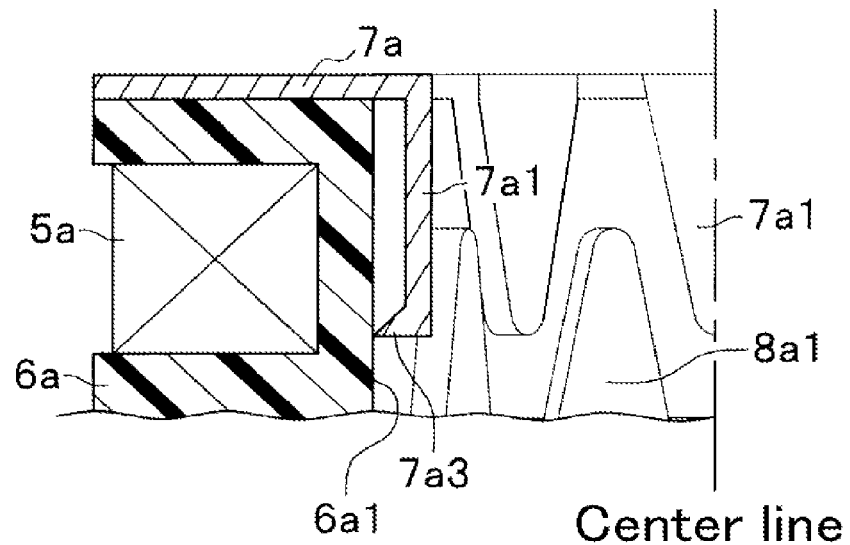
FIG. 7A is a schematic cross sectional view of a part of a first outer yoke, taken along the line A-A indicated in FIG. 5, wherein a protruding portion is formed by plastic deformation at a distal end of a first pole tooth.
Figure 7B:
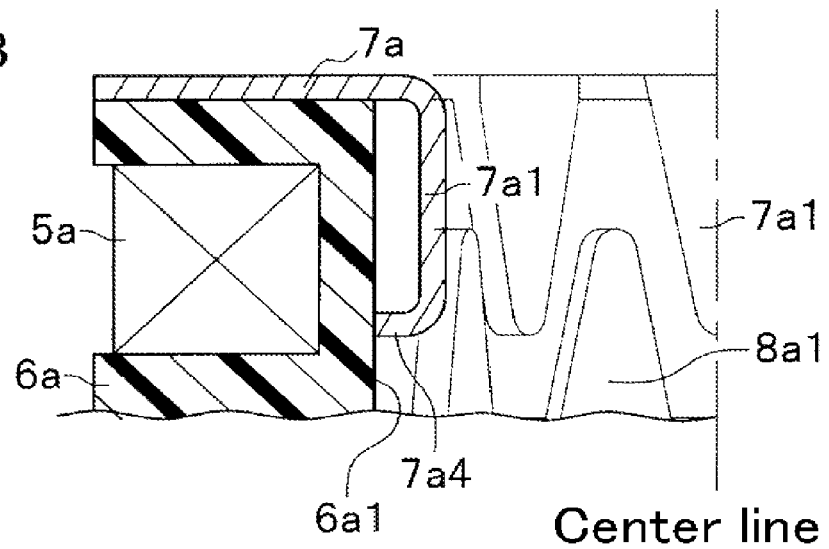
FIG. 7B is a schematic cross sectional view of a part of a first outer yoke, taken along the line A-A indicated in FIG. 5, wherein a bent portion is formed by bending work at a distal end of a first pole tooth.

Specifically, a protruding portion 7a3 (refer to FIG. 7A) or a bent portion 7a4 (refer to FIG. 7B) by bending work is formed as a contact portion at the distal end portion (7a2, 7b2, 8a2, 8b2) of the pole tooth (7a1, 7b1, 8a1, 8b1) as shown in FIG. 7A or 7B so that the distal end portion (7a2, 7b2, 8a2, 8b2) is adapted to make contact with the inner circumferential surface (6a1, 6b1) of the bobbin (6a, 6b) with a moderate pressure, whereby the pole tooth (7a1, 7b1, 8a1, 8b1) of the yoke (7a, 7b, 8a, 8b) is prevented from being pendent (cantilevered).

With the arrangement described above, the same effect as obtained in the first method can be achieved for suppressing the vibration of the pole tooth (7a1, 7b1, 8a1, 8b1).

FIG. 7A shows a configuration in which the protruding portion 7a3 as a vibration suppressing means is formed by plastic deformation at the distal end portion 7a2 of the first pole tooth 7a1 of the first outer yoke 7a.

FIG. 7B shows a configuration in which the bent portion 7a4 as a vibration suppressing means is formed by bending work at the distal end portion 7a2 of the first pole tooth 7a1 of the first outer yoke 7a.

<Noise Reduction Effect>

Description will be made of the result of a noise test in which the location of supporting the pole tooth (7a1, 7b1, 8a1, 8b1) is varied.

Figures 8A, 8B:
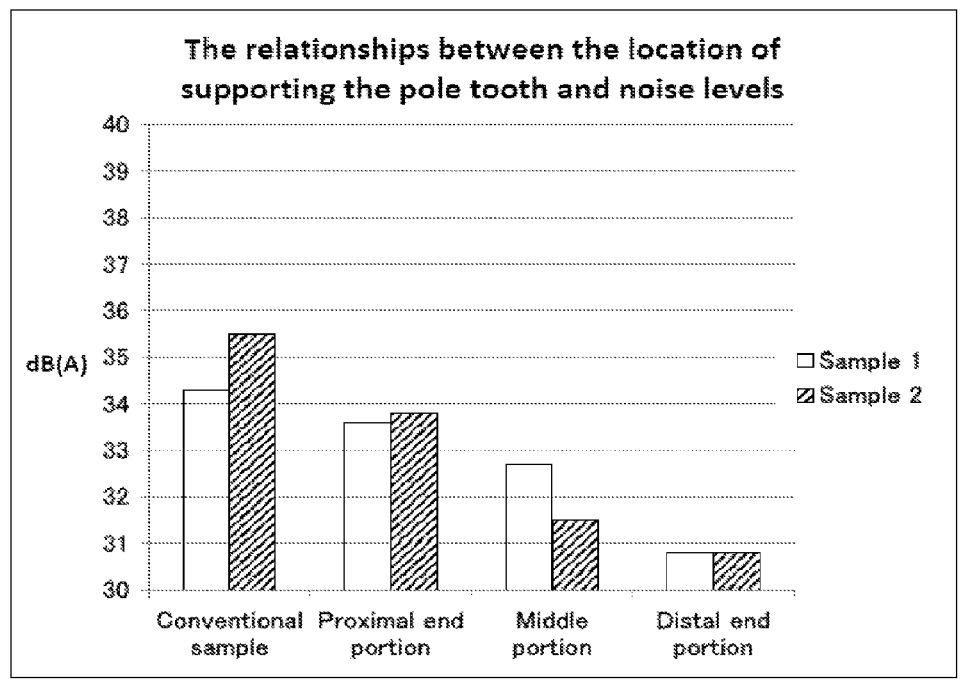
FIG. 8A is a table of noise levels differing from one another depending upon a location of a pole tooth with which a bobbin makes contact.
FIG. 8B is a graph of the noise levels shown in FIG. 8A.

About noise reduction effect according to the variation of the location of supporting the pole tooth (7a1, 7b1, 8a1, 8b1) on the inner circumferential surface (6a1, 6b1) of the bobbin (6a, 6b), data shown in FIG. 8A and 8B are gained.

Noise levels according to the variation of the location of supporting the pole tooth (7a1, 7b1, 8a1, 8b1) on the inner circumferential surface (6a1, 6b1) of the bobbin (6a, 6b) are presented in a table of FIG. 8A. The noise levels are presented also in a graph of FIG. 8B.

Figure 9A:
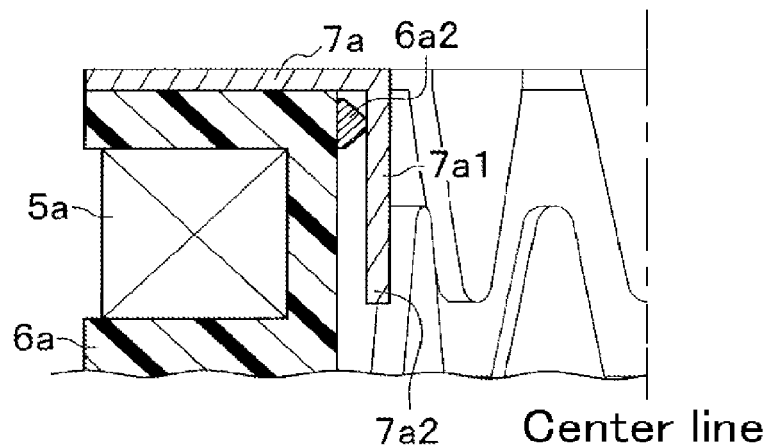
FIGS. 9A, 9B and 9C are a schematic cross sectional view of a part of the stator, taken along the line A-A indicated in FIG. 5, wherein a proximal end portion, a middle portion and a distal end portion of the pole tooth are supported (fixed), respectively.
Figure 9B:
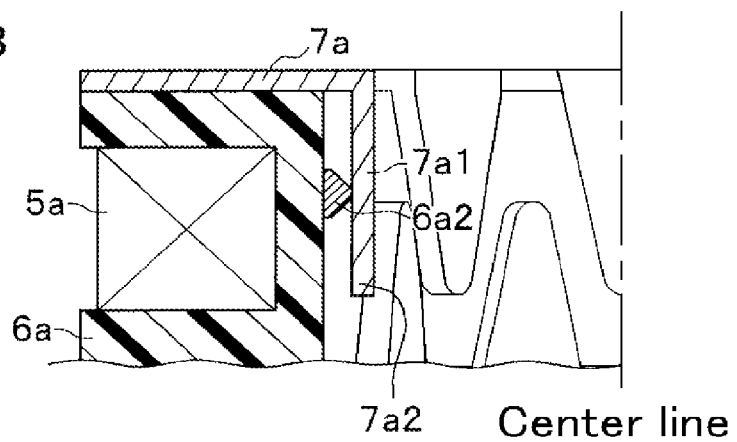
Figure 9C:
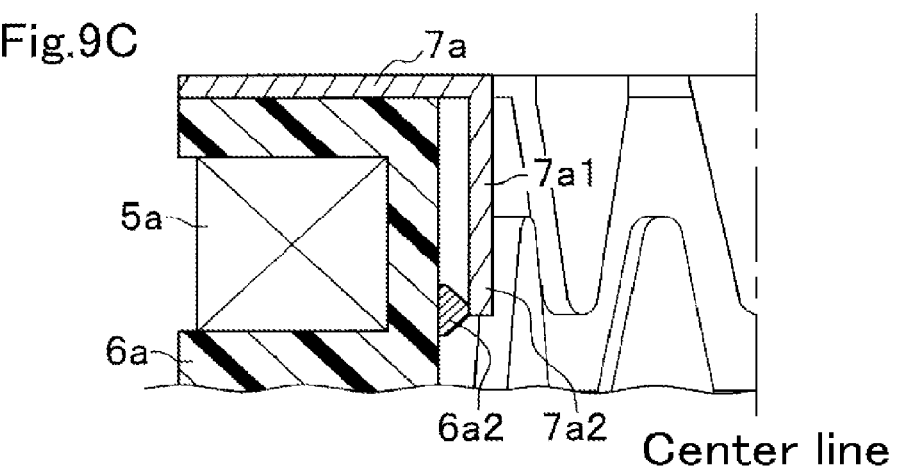

FIGS. 9A, 9B and 9C show the conditions (difference of the location of supporting) for the noise test described above with reference to FIGS. 8A and 8B and schematically illustrate respective cross sections of a part of the pole tooth (7a1, 7b1, 8a1, 8b1), taken along the line A-A indicated in FIG. 5, wherein a proximal end portion, a middle portion and a distal end portion of the pole tooth (7a1, 7b1, 8a1, 8b1) are supported (fixed), respectively.

The noise test was conducted on two each of four different types of specimens; one conventional sample with a pole tooth disposed free, and three trial samples respectively configured such that a proximal end portion, a middle portion and a distal end portion of the pole tooth (7a1, 7b1, 8a1, 8b1) are supported (fixed).

According to FIGS. 8A and 8B, the conventional sample generated the loudest noise, and the noise level of the trial samples became lower in the order of "supported (fixed) at the proximal end portion of the pole tooth (7a1, 7b1, 8a1, 8b1)", "supported (fixed) at the middle portion thereof", and "supported (fixed) at the distal end portion thereof".

It is found out that compared with the conventional samples, the trial samples, which are configured such that the proximal end portion, the middle portion and the distal end portion of the pole tooth (7a1, 7b1, 8a1, 8b1) are supported (fixed) (refer to FIGS. 9A, 9B and 9C, respectively), have their noise levels reduced by some 1 to 5 dB, which indicates that about 3 dB reduction is achieved on average.

This is considered to be due to the fact that in the conventional samples, because the pole tooth is disposed entirely free (the pole tooth is cantilevered), the pole tooth is subject to a large vibration thus generating the loudest noise.

Also, it is considered that in the three types of trial samples, because the distance between the point of support and the free distal end of the cantilevered pole tooth (7a1, 7b1, 8a1, 8b1) decreases while the location of supporting the pole tooth (7a1, 7b1, 8a1, 8b1) shifts from the proximal end portion to the middle portion and then to the distal end portion, the vibration of the pole tooth (7a1, 7b1, 8a1, 8b1) becomes smaller and smaller, and thus the resulting noise becomes lower accordingly.

In this connection, the intersyllable interval of vibration becomes longer while the location of supporting the pole tooth (7a1, 7b1, 8a1, 8b1) shifts from the proximal end portion to the middle portion and then to the distal end portion, but this has a low impact on vibration because the material of the pole tooth (7a1, 7b1, 8a1, 8b1) is stiff.

On the other hand, the distance defined between the point of support and the free distal end of the cantilevered pole tooth (7a1, 7b1, 8a1, 8b1) is assumed to have a large effect on the noises resulting from vibration.

While the pole tooth (7a1, 7b1, 8a1, 8b1) may be supported (fixed) at any point between the proximal end portion and the distal end portion thereof, it is more preferable when the pole tooth (7a1, 7b1, 8a1, 8b1) are supported (fixed) at a point closer to the distal end portion. Consequently, it is the most preferable when the pole tooth (7a1, 7b1, 8a1, 8b1) is supported (fixed) at the distal end portion.

However, in the case when the contact portions are formed separately from the inner circumferential surfaces 6a1 and 6b1, if the contact portions, which work as vibration suppressing means and which are formed at the inner circumferential surfaces 6a1 and 6b1 of the bobbins 6a and 6b which oppose the distal end portions 7a2, 7b2, 8a2 and 8b2 of the pole teeth 7a1, 7b1, 8a1 and 8b1, are provided according to the number of the pole teeth 7a1, 7b1, 8a1 and 8b1, then the assembly work is troublesome.

Alternative Examples of Contact Portions

Figure 10A:
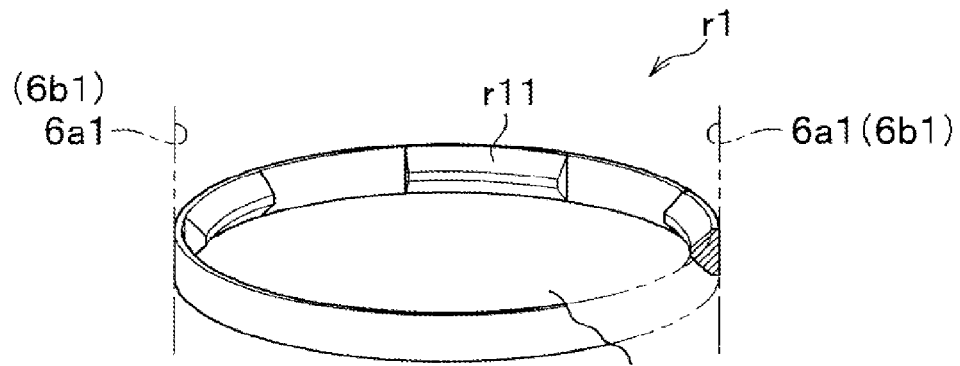
FIGS. 10A, 10B and 10C are a perspective view of a ring-shaped member formed as a separate member.
Figure 10B:
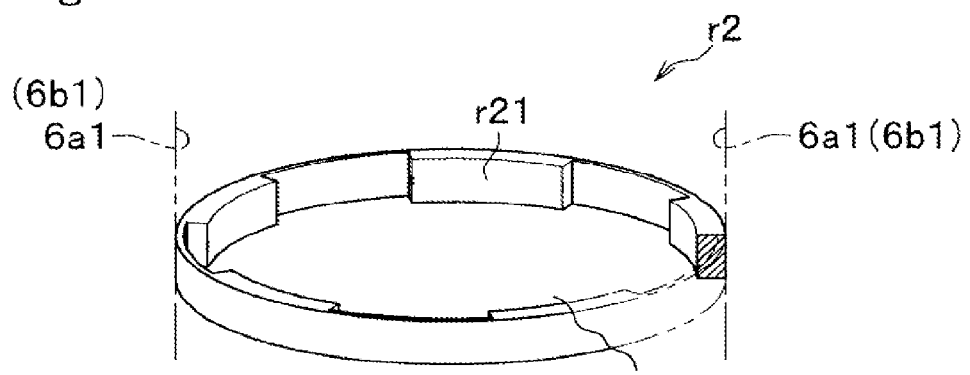
Figure 10C:
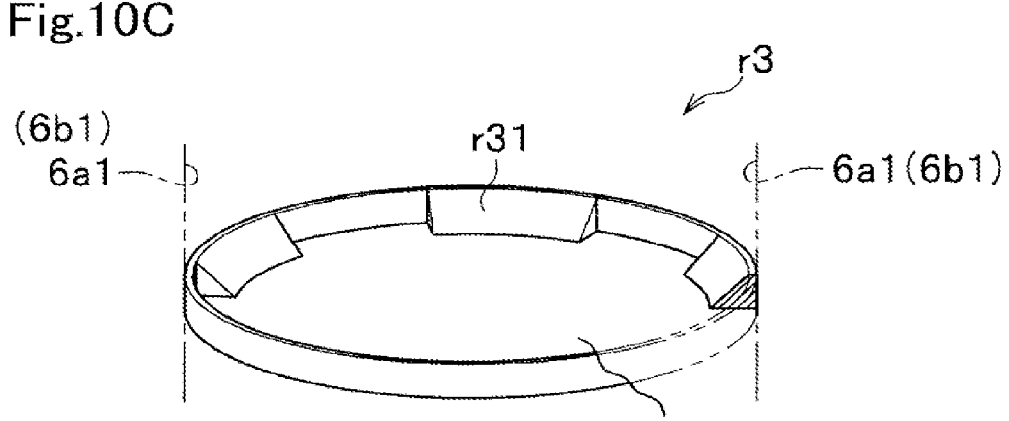

FIGS. 10A, 10B and 10C perspectively show examples of ring-shaped members r1, r2 and r3 when the contact portion is formed as a separate member.

The ring-shaped members r1, r2 and r3 respectively include a plurality of contact portions r11, r21 and r31 which work as vibration suppressing means, which are arranged along a circular line and which are provided to the number of the pole teeth 7a1, 7b1, 8a1 and 8b1. With the ring-shaped members r1, r2 and r3 described above, the assembly work can be performed like a process of putting an O-ring.

The ring-shaped member r1 shown in FIG. 10A is an example where the contact portion r11 has a cross section of substantially an isosceles triangle.

The ring-shaped member r2 shown in FIG. 10B is another example where the contact portion r21 has a cross section of substantially a rectangle. The ring-shaped member r3 shown in FIG. 10C is still another example where the contact portion r31 has a cross section of substantially a right triangle.

For example, the contact portion 6a2 with which the distal end portion 7a2 of the first pole tooth 7a1 comes into contact, the contact portion (not shown in the figures) with which the distal end portion 8a2 of the first pole tooth 8a1 comes into contact, the contact portion (not shown in the figures) with which the distal end portion 7b2 of the second pole tooth 7b1 comes into contact, and the contact portion (not shown in the figures) with which the distal end portion 8b2 of the second pole tooth 8b1 comes into contact may be constituted by the contact portion r11 of the ring-shaped member r1 which is formed as a separate member.

Since the distal end portion 7a2 of the first pole tooth 7a1 and the distal end portion 8a2 of the first pole tooth 8a1 are provided to face the inner circumferential surface 6a1 of the first bobbin 6a, two of the ring-shaped members r1 are inserted at the inner circumferential surface 6a1 of the first bobbin 6a.

Also, since the distal end portion 7b2 of the second pole tooth 7b1 and the distal end portion 8b2 of the second pole tooth 8b1 are provided to face the inner circumferential surface 6b1 of the second bobbin 6b, two of the ring-shaped members r1 are inserted at the inner circumferential surface 6b1 of the second bobbin 6b.

The ring-shaped members r2 and r3 are handled in the same way as the ring-shaped member r1.

Thus, during the assembly work, the ring-shaped members r1, r2 and r3 are inserted at the inner circumferential surfaces 6a1 and 6b1 of the bobbins 6a and 6b. In this connection, the ring-shaped members r1, r2 and r3 may alternatively be applied in a combined manner.

In the above configuration, as a countermeasure against the vibration of the pole tooth which causes noises of a motor, the contact portion (6a2, 7a3, 7a4) which works as a vibration suppressing means is provided so as to make contact with the bobbin (6a, 6b) to thereby suppress the pole teeth 7a1, 7b1, 8a1 and 8b1 from vibrating.

The distal end portions 7a2, 7b2, 8a2 and 8b2 of the pole teeth 7a1, 7b1, 8a1 and 8b1 are supported on the bobbins 6a and 6b in the direction of sheet thickness of the pole teeth 7a1, 7b1, 8a1 and 8b1, whereby the pole teeth 7a1, 7b1, 8a1 and 8b1 are suppressed from vibrating when the motor 1 rotates, which results in surely reducing the noises of the motor 1.

Specifically, as shown in FIGS. 8A and 8B, it was confirmed that the noises can be reduced by 1 to 5 dB when the distal end portions 7a2, 7b2, 8a2 and 8b2 of the pole teeth 7a1, 7b1, 8a1 and 8b1 are supported (fixed) at the contact portions.

Thus, the noises from a motor can be effectively reduced by slightly modifying the configuration.

If the contact portion is formed integrally with the bobbins 6a and 6b, then the bobbins 6a and 6b are subject only to a slight modification, which has virtually no effect on the cost. That is to say, the increase of cost can be suppressed.

If the contact portions, when formed separately from the bobbins 6a and 6b, are constituted by the ring-shaped members r1, r2 and r3, then the contact portions have simply to be inserted at the inner circumferential surfaces 6a1 and 6b1 thus simplifying the assembly work.

Modified Embodiment

Description will now be made of a motor 21 according to a modified embodiment of the present invention.

Figure 11A:
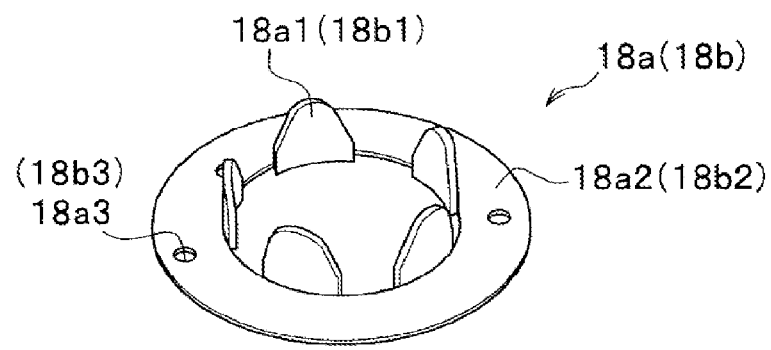
FIG. 11A is a perspective view of a first (second) inner yoke according to a modified embodiment of the present invention.
Figure 11B:
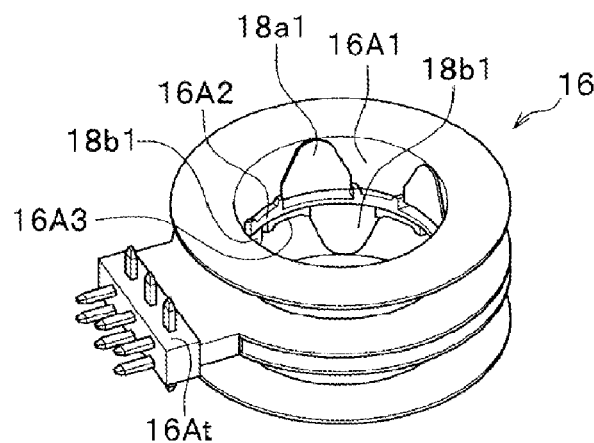
FIG. 11B is a perspective view of the first and second inner yokes unified with bobbins by insert molding.
Figure 11C:
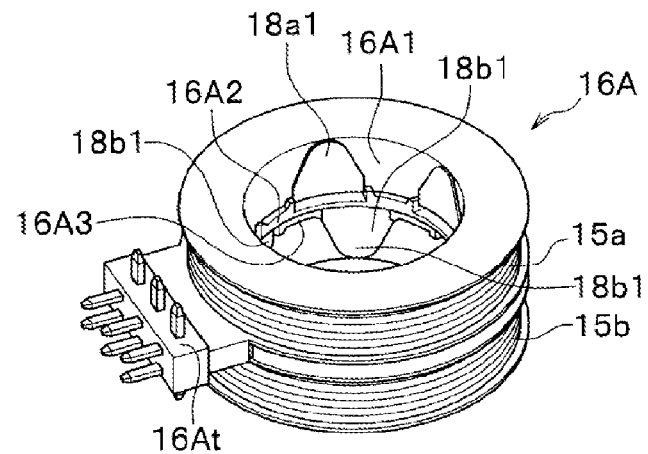
FIG. 11C is a perspective view of the bobbins having windings wound therearound.

FIG. 11A perspectively shows first (second) inner yoke 18a (18b) according to the modified embodiment, FIG. 11B shows the inner yokes 18a and 18b integrated with a bobbin 16 by insert molding, and FIG. 11C shows windings 15a and 15b wound around the bobbin 16.

In the modified embodiment, the first and second inner yokes 18a and 18b are integrated, by insert molding, with the bobbin 16 around which the windings 15a and 15b are wound.

The first inner yoke 18a shown in FIG. 11A includes a ring-shaped plate portion 18a2 made of a flat steel plate, and a given plurality of first pole teeth 18a1 formed along an inner circumferential surface 16A1 (refer to FIG. 11B) of the bobbin 16 and bent so as to be oriented perpendicular to the ring-shaped plate portion 18a2.

A plurality of positioning holes 18a3 are formed at the ring-shaped plate portion 18a2 of the first inner yoke 18a. The first inner yoke 18a, when put in a molding die for insert molding process, is duly positioned by means of the positioning holes 18a3.

In the same way, the second inner yoke 18b includes a ring-shaped plate portion 18b2 made of a flat steel plate, and a given plurality of second pole teeth 18b1 formed along the inner circumferential surface 16A1 (refer to FIG. 11B) of the bobbin 16 and bent so as to be oriented perpendicular to the ring-shaped plate portion 18b2.

A plurality of positioning holes 18b3 are formed at the ring-shaped plate portion 18b2 of the first inner yoke 18b. The second inner yoke 18b, when put in a molding die for insert molding process, is duly positioned by means of the positioning holes 18b3.

According to the modified embodiment, the first and second inner yokes 18a and 18b shown in FIG. 11A are arranged in a back-to-back manner, specifically such that respective ring-shaped plate portions 18a2 and 18b2 are attached to each other so that the first pole teeth 18a1 of the first inner yoke 18a and the second pole teeth 18b1 of the second inner yoke 18b extend axially outward in respective directions opposite to each other (refer to FIG. 11B).

The first and second inner yokes 18a and 18b arranged as described above are integrated, by insert molding, with a bobbin having a structure which is formed by integrating the first and second bobbins 6a and 6b explained with reference to the embodiment described earlier. Thus, the bobbin 16 shown in FIG. 11B is formed.

First and second windings 15a and 15b are wound around the bobbin 16, and a bobbin assembly 16A shown in FIG. 11C is formed.

The first and second pole teeth 18a1 and 18b1 of the first inner yokes 18a and 18b are embedded at the inner circumferential surface 16A1 of the bobbin assembly 16A, more specifically of the bobbin 16.

Figure 12:
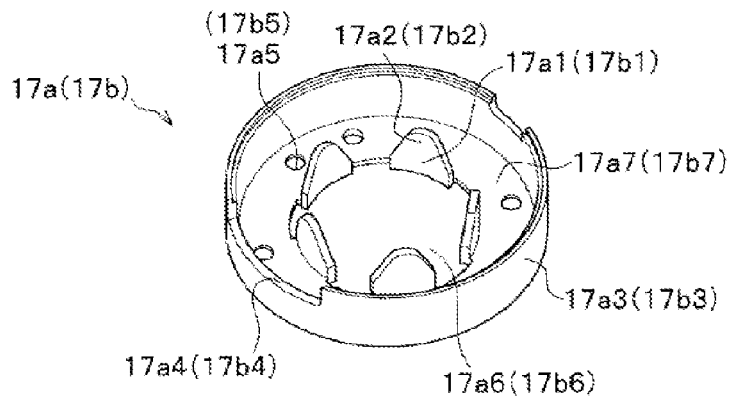
FIG. 12 is a perspective view of a first (second) outer yoke according to the modified embodiment.

Also, referring to FIG. 12 which perspectively shows a first (second) outer yoke 17a (17b), a contact portion 16A2 (refer to FIG. 11B) with which a distal end portion 17a2 of a first pole tooth 17a1 of the first outer yoke 17a comes into contact, and a contact portion 16A2 (refer to FIG. 11B) with which a distal end portion 17b2 of a second pole tooth 17b1 of the second outer yoke 17b comes into contact are formed integrally with the inner circumferential surface 16A1 of the bobbin assembly 16A, more specifically of the bobbin 16.

The first outer yoke 17a shown in FIG. 12 is made of a steel plate, and formed by deep drawing work into a substantially circular short cylindrical shape provided with a plate portion at one end having an opening 17a6 at the center.

Specifically, the first outer yoke 17a includes: a flat plate portion 17a7 having the opening 17a6 at the center; a plurality of first pole teeth 17a1 bent up from the flat plate portion 17a7 and standing along the inner circumferential surface 16A1 of the bobbin assembly 16A; and a circular cylinder portion 17a3 adapted to cover an outer circumferential surface of the bobbin assembly 16A.

A cutout portion 17a4, which is so shaped to allow a terminal block 16At (refer to FIG. 11C) of the bobbin assembly 16A to protrude through, is provided at the circular cylinder portion 17a3.

Also, the flat plate portion 17a7 is provided with a plurality of positioning holes 17a5 through which positioning bosses (not shown in the figures) formed at the bobbin assembly 16A are put when the first outer yoke 17a is attached to the bobbin assembly 16A.

The second outer yoke 17b has a similar shape as the first outer yoke 17a and therefore is denoted with a reference numeral having "b" changed from "a" of 17a, and a detailed description thereof will be omitted.

Figure 13:
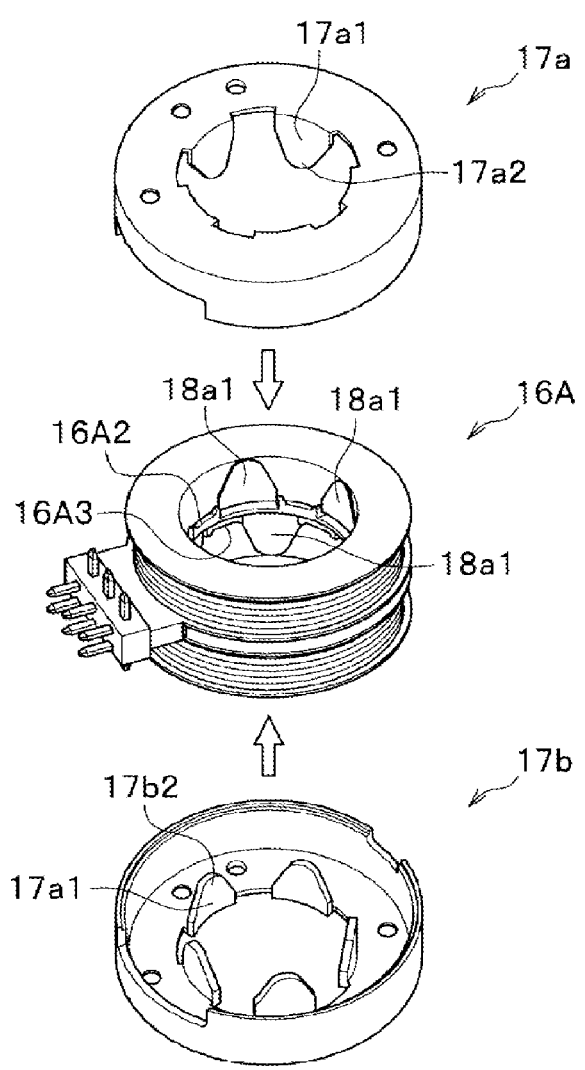
FIG. 13 is a perspective view of a process for assembling a stator according to the modified embodiment.

FIG. 13 perspectively shows a process for assembling a stator 21K according to the modified embodiment.

Referring to FIG. 13, the stator 21K of the motor 21 is assembled in such a manner that the first outer yoke 17a and the second outer yoke 17b are put on the bobbin assembly 16A as indicated by arrows (axial direction) from the both sides so as to enclose the bobbin assembly 16A.

Figure 14A:
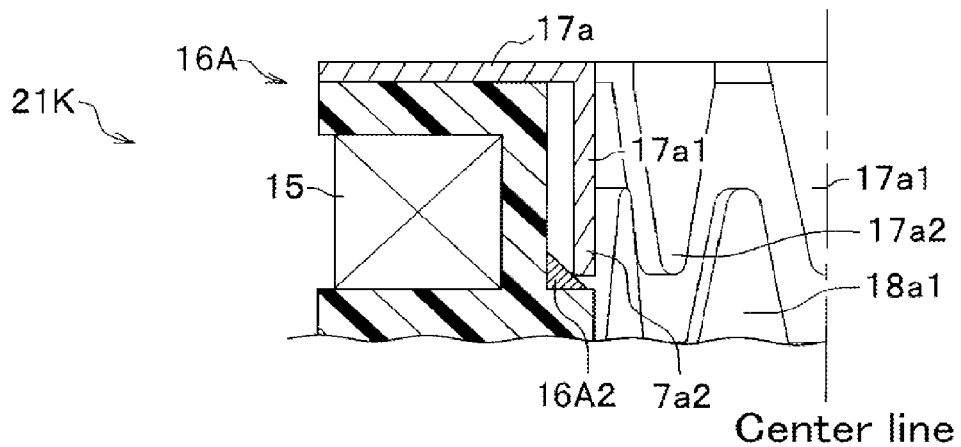
FIG. 14A is a schematic cross sectional view of a part of the stator according to the modified embodiment, taken along a radial direction at a middle portion of a first pole tooth.
Figure 14B:
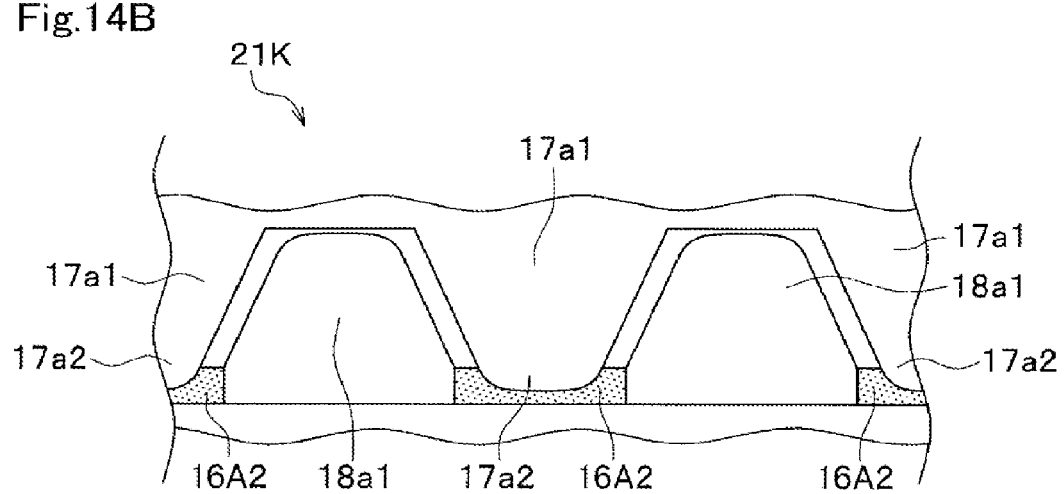
FIG. 14B is a schematic plan view of a part of an inner circumferential surface of a bobbin assembly, seen from a rotor.

FIG. 14A schematically shows a cross section of a part of the stator 21K according to the modified embodiment, taken along the radial direction at the middle portion of the first pole tooth 17a1, and FIG. 14B schematically shows the inner circumferential surface 16A1 of the bobbin assembly 16A of the stator 21K, seen from the rotor.

Referring to FIG. 14A, the distal end portion 17a2 of the first pole tooth 17a1 of the first outer yoke 17a makes contact with a contact portion 16A2, which results in suppressing the first pole tooth 7a1 from vibrating, thus reducing noises.

In the same way, the distal end portion 17b2 of the second pole tooth 17b1 of the second outer yoke 17b makes contact with a contact portion 16A3 (refer to FIG. 11C), which results in suppressing the second pole tooth 7b1 from vibrating, thus reducing noises.

According to the modified embodiment, the distal end portion 17a2 of the first pole tooth 17a1 and the distal end portion 17b2 of the second pole tooth 17b1 make contact with the contact portion 16A2 and the contact portion 16A3, respectively, whereby a moderate pressure is given to the distal end portions 17a2 and 17b2 of the first and second pole teeth 17a1 and 17b1, which suppresses the first and second pole teeth 17a1 and 17b1 from vibrating. Accordingly, the noises of the motor 21 are reduced.

While the modified embodiment exemplifies a case in which the distal end portion 17a2 of the first pole tooth 17a1 and the distal end portion 17b2 of the second pole tooth 17b1 make contact, respectively, with the contact portion 16A2 and the contact portion 16A3 in the thickness direction of the steel plate, it may also be configured such that any portions of the first and the second pole teeth 17a1 and 17b1 located between the proximal and distal end portions thereof make contact, respectively, with the contact portion 16A2 and the contact portion 16A3 as long as the contact is made in the thickness direction of the steel plate.

However, in view of the effect for vibration suppression, it is preferable that the contact is made at a portion of the first and second pole teeth 17a1 and 17b1 located closer to the distal end portions 17a2 and 17b2 (refer to FIGS. 8A and 8B).

In this connection, the cost can be reduced when the contact portions 16A2 and 16A3 are formed integrally with the bobbin 16.

Also, the contact portions 16A2 and 16A3, while formed integrally with the bobbin 16 in the above described case exemplified by the modified embodiment, may alternatively be formed separately from the bobbin 16.

The present invention is applicable to a claw pole type motor and can be applied to a stepping motor that is a typical claw pole type motor, and also to a DC motor.

While the present invention has been described with respect to the specific exemplary embodiments, it is to be understood that the present invention described above is not limited thereto but encompasses various modifications which fall within the spirit and scope of the present invention. That is to say, the present invention is subject to modification, variation and alteration as appropriate without departing from the spirit and scope of the present invention.

What is claimed is:

1. A claw pole type motor comprising:
   a rotor which includes a magnet and a rotation shaft around which the magnet is attached;
   a stator which includes a bobbin, a winding wound around the bobbin, and a yoke which includes a plurality of pole teeth disposed to oppose the magnet and which is located outside the winding; and
   a vibration suppressing means which makes contact with a distal end portion of the pole tooth, and by which the pole tooth is pressure-supported on an inner circumferential surface of the bobbin, whereby the pole tooth is suppressed from vibrating.

2. The claw pole type motor according to claim 1, wherein the vibration suppressing means is formed integrally with the bobbin when the bobbin is produced.

3. The claw pole type motor according to claim 1, wherein the vibration suppressing means is formed at a ring-shaped member which is inserted at the inner circumferential surface of the bobbin.

4. A claw pole type motor comprising:
   a rotor which includes a magnet and a rotation shaft around which the magnet is attached;
   a stator which includes a bobbin, a winding wound around the bobbin, and a yoke which includes a plurality of pole teeth disposed to oppose the magnet, and which is located outside the winding; and
   either a protruding portion or a bent portion which is disposed at a distal end portion of the pole tooth, and which makes contact with an inner circumferential surface of the bobbin thereby working as a vibration suppressing means, whereby the distal end portion of the pole tooth is pressure-supported on the inner circumferential surface of the bobbin.

5. A claw pole type motor comprising:
   a rotor which includes a magnet and a rotation shaft around which the magnet is attached;
   a stator which includes a bobbin, a winding wound around the bobbin, and a yoke which includes a plurality of pole teeth disposed to oppose the magnet and which is located outside the winding; and
   a vibration suppressing part which makes contact with a distal end portion of the pole tooth, and by which the pole tooth is pressure-supported on an inner circumferential surface of the bobbin, whereby the pole tooth is suppressed from vibrating.

\* \* \* \* \*